United States Patent

[11] 3,627,744

| [72] | Inventors | Byrd Hopkins<br>Longmeadow;<br>Robert A. Bonsall, Wilbraham, both of Mass. |
|---|---|---|
| [21] | Appl. No. | 759,309 |
| [22] | Filed | Sept. 12, 1968 |
| [45] | Patented | Dec. 14, 1971 |
| [73] | Assignee | Monsanto Company<br>St. Louis, Mo. |

[54] METHOD FOR POLYMERIZING VINYL HALIDE POLYMERS
6 Claims, 1 Drawing Fig.

[52] U.S. Cl................................................... 260/87.5,
260/85.5, 260/86.1, 260/87.1, 260/87.7, 260/879,
260/884, 260/899
[51] Int. Cl...................................................... C08f 1/11,
C08f 3/30, C08f 15/00
[50] Field of Search............................................ 260/92.8
W, 87.5

[56] References Cited
UNITED STATES PATENTS

| 2,383,069 | 8/1945 | Marks............................ | 260/92.8 |
| 2,694,700 | 11/1954 | Shanta........................... | 260/92.8 |
| 3,340,243 | 9/1967 | Beer............................... | 260/92.8 |
| 3,451,985 | 6/1969 | Mahlo............................ | 260/92.8 |
| 3,488,328 | 1/1970 | Shunichi, Koyanagi et al. | 260/92.8 |

*Primary Examiner*—Joseph L. Schofer
*Assistant Examiner*—John A. Donahue, Jr.
*Attorneys*—H. B. Roberts, A. E. Hoffman and P. J. Hogan

ABSTRACT: In a substantially isothermal process for the polymerization of vinyl halide monomer formulations in aqueous dispersion, the desired polymerization temperature is maintained by heat-exchange contact with the liquid phase, by condensation and return of vapors and by injection of a relatively low temperature inert liquid. Stable dispersion for the suspension/reflux polymerization temperature may be enhanced by use of a mixture of a cellulose ether, a partially hydrolyzed polyvinyl acetate and a sorbitan fatty acid ester.

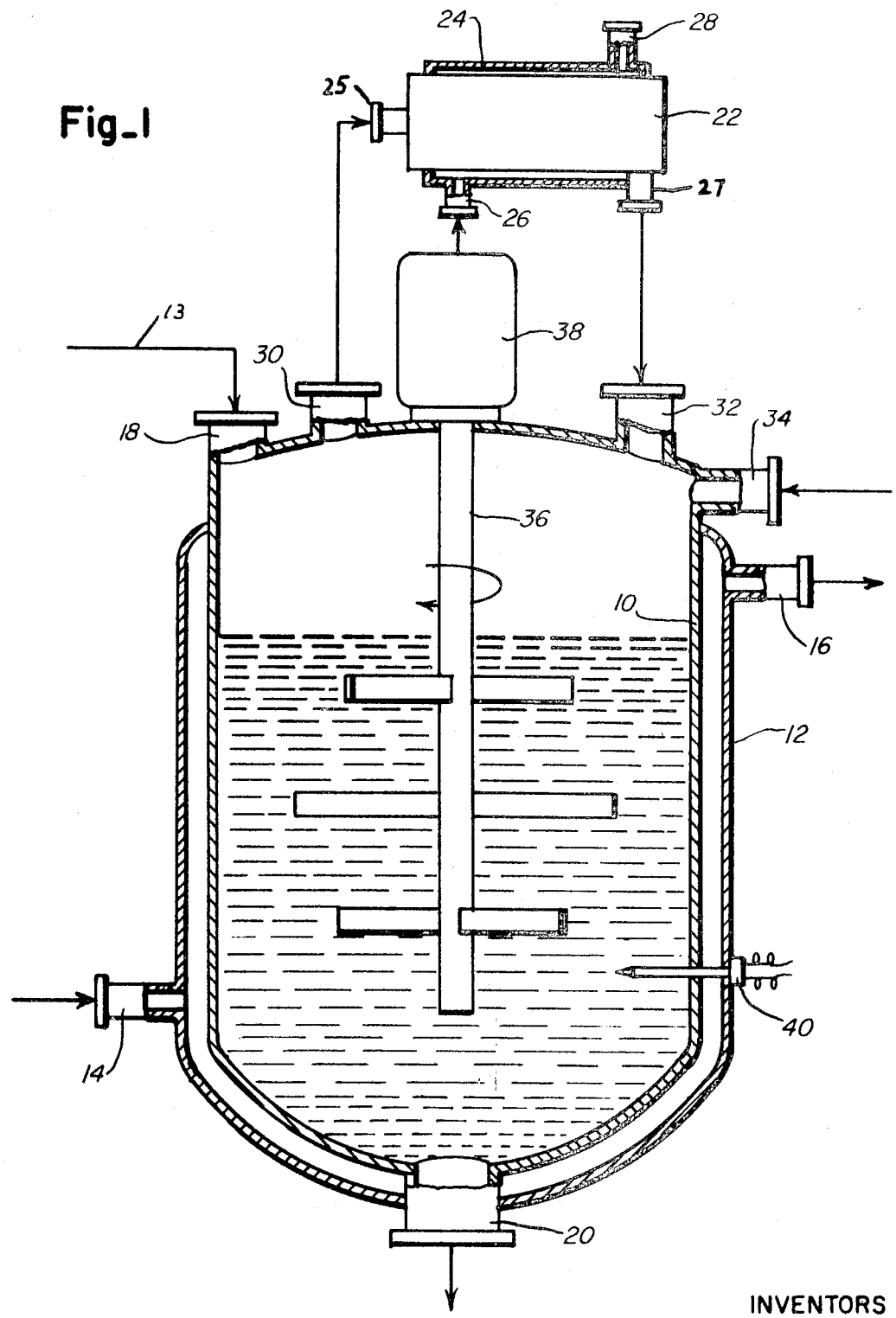

METHOD FOR POLYMERIZING VINYL HALIDE POLYMERS

BACKGROUND OF THE INVENTION

Numerous techniques and modifications there of have been developed for carrying out the batch polymerization of vinyl halide monomers in aqueous dispersion. From practical and economical standpoints, it is most advantageous to effect such a reaction to a relatively high degree of conversion of monomers over as short a period of time as possible because of the increases in productivity and profit margins which are thereby made possible and because it is also possible to enhance product quality. Although attempts are continually made by the industry to minimize the turnaround time for reaction cycles, the past attempts have met with only limited success; as a result, for example, the suspension polymerization of vinyl halide-type monomers normally requires at least about 8, and more often 9 or more hours. A number of highly active polymerization initiators have been developed to shorten the reaction times necessary, but their use introduces practical problems of adequate heat transfer from the polymerization mixture, maintenance of desirable temperatures therein, reaction control and product quality. Heat removal may be facilitated by heat transfer contact in the liquid (e.g., jacket cooling) and vapor (e.g. condensation and recycle) phases, but the conventional applications of these techniques have not proven adequate to allow full advantage to be taken of the highly active initiators and optimum temperature control.

A second major deficiency of many of the prior art methods is their failure to provide vinyl halide resins which exhibit a desirable balance of good properties. This is believed to be attributable not only to the duration of the reaction and the polymerization temperatures maintained throughout, but also to the additives which are necessarily used if an adequate dispersion of reactants is to be maintained. Numerous aids to dispersion have in the past been used alone and in combination with one another, but frequently the amounts thereof required for good results make their use unduly expensive, and most often they do not provide an optimum balance of properties.

Accordingly, it is an object of the present invention to provide a batch process for polymerizing vinyl halide momomer formulation in aqueous dispersion, in which a novel series of heat-exchange steps enables minimization of the reaction time required for the polymerization cycle.

It is also an object to provide such a process in which the temperatures in the polymerization mixture may readily be regulated to provide a high level of control over the reaction and good product quality.

Another object is to provide such a process in which the highly active type of polymerization initiators may be used to full advantage with a minimization of attendant problems.

A further object is to provide such a process in which a novel dispersant aid mixture is employed to produce a vinyl halide resin exhibiting an optimum balance of properties.

Still another object is to provide such a process which may be effected conveniently and economically and which requires a minimum amount of modification of existing equipment for its use.

BRIEF DESCRIPTION OF THE DRAWING

FIG. 1 is a partially diagrammatical illustration of a reaction vessel suitable for use in the method of the present invention.

SUMMARY OF THE INVENTION

It has now been found that the foregoing and related objects can be readily attained in a method of polymerizing vinyl halide monomers in aqueous dispersion under substantially isothermal conditions. A vinyl halide monomer formulation, water and an effective amount of a highly active polymerization initiator are admixed to provide a polymerization mixture which is adjusted to a desired polymerization temperature, usually of about 45.0° to 70.0° C., to effect polymerization of the polymerizable monomers therein. During the polymerization reaction, the mixture is maintained under substantially isothermal conditions by (1) extracting heat by heat-exchange contact between the body of liquid in the polymerization mixture and a heat-exchange medium, (2) allowing a portion of the monomers to escape from the body of the polymerization mixture as a vapor phase and condensing the vapor phase and returning the condensate to the body of the mixture, and (3) while concurrently extracting heat from the polymerizing mixture by liquid-phase heat exchange and vapor-phase condensation, introducing an inert liquid, at a temperature lower than the batch temperature in the body of the polymerization mixture, thereinto at about the point that the polymerization reaction accelerates rapidly. The reaction is continued until the desired degree of completion of conversion of monomers to polymers. In a preferred embodiment, a novel and highly effective mixture of dispersing agents is included in the polymerization mixture to provide highly desirable stable dispersion under the reflux conditions without producing undue foaming. This mixture comprises a water-soluble cellulose ether selected from the group consisting of methyl cellulose, ethyl cellulose, hydroxypropyl methyl cellulose, hydroxyethyl cellulose, and mixtures thereof; a partially hydrolyzed polyvinyl acetate; and a sorbitan fatty acid ester surfactant, the fatty acid chain of which contains from 12 to 18 carbon atoms. The most desirable of dispersing agent mixture comprises hydroxypropyl methyl cellulose, sorbitan monolaurate and a polyvinyl acetate in which the residial acetate content is about 20 to 45 weight percent.

DETAILED DESCRIPTION OF THE ILLUSTRATED AND OF THE PREFERRED EMBODIMENTS

Turning now in detail to the appended drawing, FIG. 1 diagrammatically illustrates the basic equipment which may be used in the method of the invention. The reaction vessel 10 has a jacket 12 thereabout through which may be circulated a heat-transfer liquid. Liquid is introduced through inlet pipe 14 into the space between the side and bottom walls of the vessel 10 and the corresponding portions of the jacket 12. The heat-transfer liquid may be used to heat or to cool the contents of the reactor 10 depending upon the stage of the cycle through heat-exchange contact with the contents in the liquid phase. The fluid exits from the jacket 12 through the outlet pipe 16 and may be heated or cooled for reuse if desired. The vessel 10 has a feed inlet port 13 through which reactants, additives, etc., may be charged, and it has a discharge port 20 for removal of the product mixture at the completion of a reaction cycle.

The reflux condenser 22 has a jacket 24 through which a cooling medium may pass from the inlet pipe 26 to the outlet pipe 28. Vapors produced in the vessel 10 are conducted from the outlet port 30 through the inlet 25 into the condenser 22, wherein they are condensed in a conventional manner by the effect of the cooling medium passing through the jacket 24. The condensate produced exits from the condenser 22 through outlet 27 and is conducted and returned in that form through the inlet port 32 of vessel 10 to the body of the polymerization mixture therein.

The reaction vessel 10 is also provided with an injection pipe 34 for introducing an inert liquid, and it has an agitator 36 and a motor 38 therefor. In addition, a thermocouple 40 projects through the sidewall of the vessel 10 and into the polymerization mixture to detect the temperature in the body thereof. It is to be understood that the drawing illustrates a fundamental apparatus design and that there may be employed modifications thereof and additions thereto, such as valves, pumps, and the like. Most desirably, the equipment is adapted for automatic operation, in which case temperature, pressure and material sensing devices and automatic control systems may be employed. Moreover, the configuration of the various pieces of equipment described may vary considerably without departing from the concept of the present invention.

THE REACTION CYCLE

In a typical polymerization cycle, water, dispersing agents and other additives are initially charged to the reaction vessel, and this is followed by evacuation and generally purging thereof, after which the polymerizable monomer formulation is introduced. While the mixture is being agitated, the polymerization initiator is introduced into the mixture to initiate polymerization. At the outset, or when the heat evolved from the exothermic reaction is sufficient to sustain it, the flow of a relatively low temperature heat-transfer medium into the reactor jacket is commenced. The temperature and flow rate of the low temperature medium are regulated to maintain the contents at substantially a constant temperature by heat-exchange contact with the liquid phase until, due to the increasing heat load thereon, maintaining the temperature by that effect alone becomes impractical. Thereafter, the condenser 22 is gradually cut into the system to condense and recycle vapors produced by and escaping from the body of the polymerization mixture, and these two effects are continued concurrently until, once again, the heat load becomes too great.

Toward the end of the polymerization cycle in this type of reaction utilizing a fast initiator, the rate of polymerization accelerates quite sharply, at which point it becomes necessary to impress a third cooling effect upon the polymerization mixture in order to maintain the substantially isothermal condition desired. This is accomplished, in accordance with the novel method of the present invention, by the injection of water or other inert liquid into the polymerization mixture, which liquid is at a temperature lower than the batch temperature thereof to effect a sensible heat dilution and thereby prevent a substantial temperature increase. Thereafter the polymerization may be carried to the desired degree completion of conversion of the monomers at a substantially constant temperature.

Since the pressures in the system will generally be autogenous, the maximum possible temperature of operation will depend largely upon the capability of the system for high-pressure operation. Although the method is applicable to polymerization reactions effected at essentially any conventional temperature for aqueous vinyl halide polymerization reactions, the specific temperature employed will usually be selected primarily on the basis of the molecular weight which is desired in the product. Preferably, however, the temperature will be maintained between about 45.0° and 70.0° C., and most desirably between about 50.0° and 65.0° C. Notwithstanding the specific temperature at which the reaction is to be carried out, it is essential to the full attainment of the objectives of the invention that the temperature be maintained substantially constant, i.e., that a substantially isothermal condition be maintained during the entire polymerization reaction.

Although the temperature of the polymerization mixture may rise as much as 10.0° C. during the portion of the reaction when the rapid acceleration of reaction rate occurs (commonly referred to as the "heat kick") without the control permitted by the method of the present invention, preferably this rise is limited to 2.5° C. or less. However, up to the point of "-heat kick," to obtain optimum polymer the temperature of the mixture should not vary by more than 0.5° C. from the desired polymerization temperature, and preferably, this deviation will not exceed 0.25° C. from that desired temperature. The foregoing defines the terms "substantially isothermal condition" and "substantially constant temperature" as they are used herein, and it will be appreciated that in a preferred embodiment the overall range of deviation or fluctuation from the selected temperature will not exceed about 2.5° C. from the desired polymerization temperature established at the commencement of the polymerization cycle. Operation in the manner herein described allows maximum advantage to be taken of the highly active polymerization initiators so as to permit decrease in average reaction periods from about 8 to 10 hours to 5 hours or less. Due to the close control of temperature, the safety of the reaction is considerably enhanced and the quality of the resins produced is improved.

In terms of conversion of monomer to polymer, the reaction temperature is generally controlled by heat exchange contact in the liquid phase until about 10.0 to 20.0 percent of the monomer charge is converted to polymer. Such contact may be effected by conventional jacket cooling or by other means, such as cooling coils within the reactor, cooled baffles and agitators and the like. Thereafter, as required, the heat of condensation is removed by cutting in the condenser, and the condensate returned to the bulk of the polymerization mixture provides further temperature control.

Normally the condenser will be controlled to become effective gradually, and concurrent cooling by the two effects is continued until the "heat kick"; this may occur when the conversion is about 65.0, and more often 75.0 to 85.0 percent complete. At this point the polymerization mixture becomes more viscous, thus diminishing the effectiveness of heat transfer in the liquid phase; the condenser also loses effectiveness because (1) the dewpoint falls off rapidly as the vapor pressure drops, which in turn decreases the mean temperature differential across the condenser tubes and (2) the vapors become more superheated and the removal of such heat is less efficient than the removal of heat by condensation. Accordingly, it becomes necessary to control the temperature by the third effect of inert liquid injection. The amount of this liquid (most conveniently water) will depend upon the degree of control necessary, the temperatures of the polymerization mixture and inert liquid, and the reactor volume available. Preferably, the inert liquid temperature is considerably below batch temperature in the body of the polymerizing mixture so that an unduly large volume thereof is not required for adequate control. Minimizing the water volume enhances the economics and convenience of the method.

It should be appreciated that the condenser operation may commence prior to the time when it is actually needed to augment the cooling capacity of the jacket, and, in fact, condenser operation may be utilized from the outset of polymerization. Under these conditions, the liquid-phase cooling effect may be reduced initially and increased as required during the cycle. In addition, to effect control of the pressure in the reactor and operation of the condenser, it may be necessary to bleed off some of the vapors in the reactor during the polymerization cycle to reduce the pressure. Generally, however, such bleeding of vapors is not necessary and is undesirable.

THE VINYL HALIDE MONOMER FORMULATION

Although both vinyl chloride and vinyl fluoride may be employed as the vinyl halide monomers in the present invention, the preferred compound is vinyl chloride and it most desirably provides the entire vinyl halide fraction or at least the predominant portion thereof. The vinyl halide may be utilized as the sole polymerizable monomeric constituent of the monomer formation, or other ethylenically unsaturated monomers copolymerizable therewith may be admixed in amounts up to about 25 percent by weight of the monomer formation, and preferably less than about 15 percent by weight thereof. Exemplary of such ethylenically unsaturated copolymerizable monomers are the vinyl esters or organic acids such as vinyl acetate, vinylidene halides such as vinylidene chloride, unsaturated nitriles such as acrylonitrile, acrylates such as methyl methacrylate, maleates, fumarates and the like.

It may also be desired to include in the monomer formation up to about 15 percent by weight thereof of a preformed rubbery polymer onto which the polymerizable monomers may be grafted. Preferably the amount of rubbery polymer will not exceed 10 percent of the weight of the monomer formulation. Rubbery polymers conventionally used for this purpose include olefinic compounds such as polyethylene, chlorinated polyethylene, chlorosulfonated polyethylene, ethylene/acrylate copolymers, ethylene/propylene copolymers, ethylene/propylene/diene terpolymers, ethylene/vinyl acetate copolymers, etc., and, mixtures thereof. The unsaturated rubbers such as the dienes are normally less desirable because of the adverse effect which they tend to have upon polymerization rates, but they nevertheless may be utilized.

Although the total quantity of monomer formation may be added to the vessel as a single charge at the beginning of the cycle, advantageous results may also be obtained if a portion of the monomer is added gradually or incrementally after the reaction has begun, desirably over at least the principal portion of the polymerization reaction. This is particularly true if the monomer is added at a rate equivalent to the rate at which shrinkage occurs in the polymerization mixture due to the formation of the polymer phase, since addition in such a manner maximizes the efficiency of reactor volume utilization and thus further enhances the economics of the method.

THE POLYMERIZATION INITIATORS

As has been indicated, the present invention entails the use of particularly active of fast initiators which significantly reduce the expense of the process by making the most efficient use of available facilities. The resultant products also exhibit superior properties partially because they are relatively free from residual catalyst and reaction byproducts due to the complete and efficient utilization of the polymerization initiator.

The initiators which are suitable for use include any free radical initiator which has a half-life of less than about 5 hours at 50° C. as determined by the decomposition rate of a 0.025 mol per liter solution thereof in 1,2-dichloroethane. Preferably, the half-life of the initiator is less than 3 hours under the same conditions. Initiators which have proven particularly effective are the acyl persulfonates described in Beer et al. U.S. Pat. No. 3,340,243, exemplary of which are acetyl cyclohexane persulfonate, acetyl methyl cyclohexane persulfonate, acetyl hexane persulfonate, and acetyl heptane persulfonate. A second specific class of initiators which may be used are the symmetrical peroxides which conform to the foregoing criterion as regards half-life. Indicative of such compounds are dihexahydro benzoyl peroxide, di-1-naphthoyl peroxide, diisobutyryl peroxide and di-t-butyl peroxy oxalate. Symmetrical azo compounds such as $\alpha, \alpha'$-azo-bis ($\alpha$-phenyl) propionitrile, $\alpha, \alpha'$-azo-bis ($\alpha, \alpha'$-dimethyl valeronitrile) and $\alpha, \alpha'$-azo-bis ($\alpha$-cyclopropyl) propionitrile are also of value in this process. In addition, a further class of valuable polymerization initiators are the dialkyl peroxydicarbonates, and most desirably, diisopropyl peroxydicarbonate.

One of the significant advantages of the process of this invention is that only very small quantities of catalyst are required or, in fact, are desirable. Thus, amounts of catalyst ranging from about 0.005 to 1.0 percent, based upon the weight of polymerizable monomers present, are suitable, and preferably the amount thereof will not exceed about 0.1 percent. Most desirably, the amount of catalyst used will be about 0.035 to 0.06 percent of the weight of polymerizable monomers since this level of concentration ensures good control of the reaction and provides most efficient catalyst utilization.

THE DISPERSING AGENTS

The method of the present invention utilizes dispersing or suspending agents for the monomer formulation, and a variety of conventional materials may be employed for this purpose. However, the method of the present invention most desirably utilizes the use of a novel mixture of dispersing agents which includes at least one of each of a water-soluble cellulose ether, a partially hydrolyzed polyvinyl acetate and a fatty acid ester of sorbitan.

More specifically, the cellulose ether may advantageously be furnished by methyl cellulose, ethyl cellulose, hydroxypropyl methyl cellulose, hydroxyethyl cellulose or a mixture thereof; preferably hydroxypropyl methyl cellulose is employed. The second component of the mixture is a partially hydrolyzed polyvinyl acetate. Preferably the polyvinyl acetate has a high residual acetate content of about 20 to 45 weight percent, and most desirably it has a low viscosity (e.g., a resin having a viscosity of about 10 centipoises measured as a 4 percent aqueous solution at 20° C. has been found to produce very good results). The polyvinyl acetate and cellulose derivative are included in a ratio of their respective weights of about 0.3 to 3.0:1, and preferably about 0.67 to 1.7:1. The combination should be included in an amount sufficient to provide about 0.04 to 0.10 part, and preferably about 0.07 to 0.09 part thereof per 100 parts by weight of polymerizable monomer.

The third member of the novel three-component mixture of dispersing agents is a fatty acid ester derivative of sorbitan. The fatty acid should contain from 12 to 18 carbon atoms to provide a carbon chain of that length to the ester, and preferably the compound is a monoester of one or more of the acids lauric, oleic, palmitic and steoric; the most desirable compound is sorbitan monolaurate. About 0.10 to 0.25 part thereof per 100 parts of polymerizable monomer is included in the polymerization mixture, and preferably the amount thereof is about 0.15 to 0.18 part.

Although the order of charging the dispersing agents to the water may vary, it is convenient to premix the polyvinyl acetate and cellulose either in desired ratio and to introduce them into the water in the reactor in that form; thereafter the sorbitan ester may be added. In any event, most advantageous results may be attained when the dispersants are admixed with the water prior to the introduction of any of the monomer formation so that that formation is initially admixed with the water in the presence of the total charge of the dispersing agent mixture.

Other types of additives may also be included in the polymerization mixture for various reasons. For example, a small amount of a heat stabilizer such 2,6-ditertiarybutyl paracresol may be admixed therewith prior to polymerization, and additives designed to modify the product characteristics, such as trichloroethylene for molecular weight control, may be used. The present polymerization mixtures may, in addition, contain other additives conventionally included in mixtures of the same type, and some materials, such as catalyst solvents and the like, may be introduced incidentally. In this regard, when for example the initiator employed is diisopropyl peroxydicarbonate, a good solvent therefor is diethyl maleate; this is because that compound may be cross-linked to become an integral part of the polymer in contract with other solvents such as xylene.

Examplary of the efficacy of the present invention are the following specific examples wherein all parts and percentages specified are on a weight basis unless otherwise indicated.

EXAMPLE 1

Into a jacketed reaction vessel fitted with a reflux condenser and having means for injecting water, are charged 150 parts water at a temperature of about 55°–60° C., and a 0.0:1.0 combination of a cellulose ester and a partially hydrolyzed polyvinyl acetate. The cellulose ester is a hydroxypropyl methyl cellulose having a 2.0 percent aqueous solution viscosity of about 50 centipoises at 20° C., sold by The Dow Chemical Co. under the trademark Methocel 65 HG. The hydrolyzed polyvinyl acetate has a residual acetate content of about 35 percent and a 4 percent aqueous solution viscosity of about 10 centipoises at 20° C.; it is sold under the trademark Gelvatol D 369 by Monsanto Company. The combination of suspending agents is introduced in an amount sufficient to provide about 0.085 part thereof. Thereafter, about 0.16 part of sorbitan monolaurate surfactant (Span 20, a product of Atlas Chemical Industries, Inc.) is charged, and the resulting mixture agitated together with a small amount of a heat stabilizer (2,6-ditertiarybutyl paracresol).

The reaction vessel is then vented, and 150 parts of vinyl chloride monomer are charged thereinto. Next a solution of diisopropyl peroxydicarbonate in diethyl maleate is added with agitation to provide about 0.048 part of initiator, immediately after which polymerization commences (the heat necessary therefor being furnished by the hot water charged initially).

During the initial stages of polymerization a cooling medium, i.e., city water, is fed into the vessel jacket to maintain the temperature therein within about 0.25° C. of 54.0° C. After about 1 hour and about 13.0 percent of the polymerizable monomers is converted to polymer, the reflux condenser is cut into the system by causing cooling water to flow therethrough, the condenser having been open to the reactor at all times. The reaction is continued for about 2½ to 2 and ¾ hours more until about 75.0 to 80.0 percent of the monomers is polymerized. At that point the "heat kick" occurs and about 0.05 gallon of water per pound of polymerization mixture is injected immediately into the reactor. A brief temperature rise of about 0.5° C. is noted and actuates the water injection to decrease the temperature to 54° C. which temperature is maintained substantially constant for about one-half to three-fourths hour more to carry the reaction to about 92 percent conversion of the monomers. The resin is recovered from the reaction mixture and some may be used to prepare specimens for evaluation.

Some of the resin is compounded with plasticizer, pigment and stabilizer in a Brabender Test to provide molded specimens of ½-gram weight for visual evaluation. The test specimens average 10 "fish eyes" which is considerably below the 35 maximum specified for commercial resins produced by use of the prior suspension polymerization technique. The specific viscosity of a solution of 0.4 gram in 100 mm. of cyclohexanone is 0.48 and the bulk density of 0.48 gram per cubic centimeter. Porosity measurements indicate the resin to exhibit more than 15 percent greater porosity than the resin produced by the prior suspension polymerization technique.

Screen analysis (U.S. Standard sieve) of the beads produced by the process is as follows:

| Screen, mesh | Percent Retained |
| --- | --- |
| 40 | 0 |
| 60 | 2 |
| 80 | 27 |
| 100 | 40 |
| 140 | 25 |
| 200 | 5 |
| Pan | 1 |

EXAMPLE 2

The method of example 1 is repeated in the same manner as described therein, with the sole exception that the mixture of dispersing agents employed is replaced in one instance by a mixture from which the hydroxypropyl methyl cellulose is omitted, and in a second instance by a mixture from which only the sorbitan monolaurate derivative is omitted. The results of using the two component mixtures described herein are compared to those obtained with the three-component mixture of example 1, and in both cases the two component systems are found to be inferior.

More specifically the resins produced in example 1 exhibit very good porosity, which is a primary characteristic desired in suspension resins, and the level of "fish eyes" (discrete irregularities, similar in appearance to fish eyes, in the surface of the finished product which are believed to be attributable to differential flow characteristics therein) is desirably low. Moreover, there is a relatively low level of foaming in the polymerization mixture during the reaction, and the characteristics thereof indicate that economics of the method are favorable.

In contrast, through "fish eye" levels of the products products produced from the reactions utilizing the two component dispersing agent mixtures of the example are low, in neither case is the porosity found to be adequate. Moreover, without the cellulose ether many desirable attributes of the method of example 1 are sacrificed. Although it is believed that a combination of the cellulose either with a relatively large amount of the sorbitan ester (e.g., on the order of twice the amount used in example 1) may improve the porosity of the product significantly, such an increase in the amount of the ester is undesirable not only from an economical standpoint but also because of the anticipated adverse effects that it would have upon the process characteristics.

EXAMPLE 3

The process of example 1 is substantially repeated, substituting for the diisopropyl peroxydicarbonate initiator employed therein α, α'-azo-bis (α, α'-dimethyl valeronitrile). The characteristics of the process and product obtained are comparable.

EXAMPLE 4

The process of example 1 is substantially repeated, but a mixture of 85 parts of vinyl chloride and 15 parts of vinyl acetate is employed in place of the vinyl chloride monomer to produce a copolymer. The characteristics of the process are comparable and the properties of the product are good.

EXAMPLE 5

The procedure of example 1 is substantially repeated, but rather than charge the entire quantity of vinyl chloride monomer initially, polymerization is initiated by introduction of catalyst to about 25 percent of the total quantity of monomer ultimately to be polymerized, the remaining 75 percent thereof being gradually added during a period of about 1½ hours starting shortly after initiation commences. The product exhibits very desirable properties.

Thus, it can be seen that the present invention provides a process employing a novel series of heat-exchange steps to polymerize vinyl halide monomer formulations in aqueous dispersion in shorter periods of time than were heretofore practical. The polymerization mixture temperatures may readily be regulated to provide a high level of reaction control and good product quality, and highly active polymerization initiators may be used to full advantage. The process may be effected conveniently and economically with only a minimum amount of modification of existing equipment. By the preferred use of a novel combination of dispersing agents, the process of the present invention may be conducted with a minimum of problems to produce superior vinyl halide resins.

What is claimed is:

1. In a method for batch-polymerizing vinyl halide monomers in aqueous dispersion under substantially isothermal conditions, the steps comprising:
   A. admixing in a reaction vessel to provide a polymerization mixture wherein the monomer formulation is dispersed in water:
      1. a vinyl halide monomer formulation comprising vinyl chloride with up to about 25 percent by weight of other ethylenically unsaturated monomers compolymerizable therewith,
      2. a dispersing agent formulation,
      3. 0.005 to 1.0 percent, based upon monomer, of a highly active polymerization initiator having a half-life of less than 5 hours at 50° C. in 1,2-dichloroethane, and
      4. water
   B. adjusting the temperature of said polymerization mixture within said reaction vessel to a desired polymerization temperature in the range from about 45° to 70° C. to effect polymerization of the polymerizable monomers therein;
   C. maintaining said polymerization mixture under substantially isothermal conditions during the polymerization of the monomer therein, the maximum temperature fluctuation from the desired polymerization temperature in said polymerization mixture being limited to 2.5° C. during the polymerization reaction and until said reaction is substantially complete by a combination of heat-exchange steps comprising:
1. extracting heat therefrom in the liquid phase by heat exchange contact between the body of the polymerization mixture and a heat-exchange medium, said liquid-phase heat exchange providing the primary cooling during the initial portion of the polymerization cycle;
2. allowing a portion of the monomers to escape from the body of the polymerization mixture as a vapor phase and returning the condensate to said body to provide cooling concurrently with liquid-phase heat exchange during the bulk of the polymerization cycle;
3. while concurrently extracting heat from said mixture by said liquid-phase heat exchange and vapor-phase condensation, introducing inert liquid into said polymerization mixture at about the point of conversion of the monomers at which the polymerization reaction accelerates rapidly, the temperature of said inert liquid being lower than the batch temperature existing in the body of said mixture, said point of acceleration of the polymerization reaction being at about 65 to 80 percent conversion of the polymerizable monomers in said monomer formulation to polymer with said low temperature inert liquid introduced serving to help control the temperature at and after the point of rapid acceleration of the polymerization reaction at which viscosity of the polymerization mixture is increased;

D. allowing the polymerization reaction to continue after the rapid acceleration to the desired degree of completion of conversion of monomers to polymer;

E. terminating the polymerization reaction; and

F. withdrawing the polymerization mixture from the reaction vessel and recovering the polymer from said polymerization mixture.

2. The method of claim 1 wherein said heat-exchange contact is essentially the sole heat exchange step employed until about 10–20 percent of the polymerizable monomer in said monomer formulation is converted to polymer and wherein said inert liquid is water.

3. The method of claim 21 wherein said dispersing agent formulation is a mixture of dispersing agents comprising a water-soluble cellulose ether selected from the group consisting of methyl cellulose, ethyl cellulose, hydroxypropyl methyl cellulose, hydroxyethyl cellulose and mixtures thereof; a partially hydrolyzed polyvinyl acetate; and about 0.1–0.25 percent of a sorbitan fatty acid ester surfactant, based upon the weight of polymerizable monomers in the monomer formulation, the fatty acid chain of the sorbitan ester containing 12 to 18 carbon atoms, the polyvinyl acetate and cellulose ether being included in a ratio of their respective weights ranging from about 0.3 to 3.0:1 and the combination there of being present in said polymerization mixture in an amount of about 0.04 to 0.1 percent based upon the weight of polymerizable monomers in said formulation.

4. The method of claim 3 wherein said surfactant is included in an amount ranging from about 0.15 to 0.18 percent based upon the weight of polymerized monomers, wherein said polyvinyl acetate has a residual acetate content of about 20 to 45 weight percent, and wherein said surfactant is a sorbitan monoester selected from the group consisting of the esters of lauric acid, oleic acid, palmitic acid, stearic acid and mixtures of said acids, and wherein the combination is present in an amount of about 0.07 to 0.09 percent by weight of the polymerizable monomers.

5. The method of claim 1 wherein the said polymerization initiator is selected from the group consisting of dialkylperoxydicarbonates, acyl persulfonates, symmetrical peroxides and symmetrical azo compounds and mixtures, thereof.

6. The method of claim 1 wherein a portion of said monomer formulation is substantially continuously introduced into said water during at least a portion of the polymerization reaction.

* * * * *